US009976926B2

(12) United States Patent
Galera Córdoba et al.

(10) Patent No.: US 9,976,926 B2
(45) Date of Patent: May 22, 2018

(54) INSPECTION METHODS AND SYSTEMS FOR DETECTING LEAKS IN VACUUM BAG ASSEMBLIES

(71) Applicant: Airbus Operations S.L., Getafe (ES)

(72) Inventors: Georgina Galera Córdoba, Getafe (ES); Augusto Pérez Pastor, Getafe (ES); Francisco Javier Jordán Carnicero, Getafe (ES); Yolanda Miguez Charines, Getafe (ES); Ángel Pablo Gordo Arias, Getafe (ES); Laura Álvarez Antoñón, Getafe (ES)

(73) Assignee: Airbus Operations S.L., Getafe (ES)

( * ) Notice: Subject to any disclaimer, the term of this patent is extended or adjusted under 35 U.S.C. 154(b) by 106 days.

(21) Appl. No.: 15/164,203

(22) Filed: May 25, 2016

(65) Prior Publication Data
US 2016/0349139 A1    Dec. 1, 2016

(30) Foreign Application Priority Data

May 28, 2015 (EP) .................................... 15382281

(51) Int. Cl.
*G01M 3/20* (2006.01)
*B29C 70/54* (2006.01)
*G01M 3/22* (2006.01)
*B29C 70/44* (2006.01)

(52) U.S. Cl.
CPC .............. *G01M 3/20* (2013.01); *B29C 70/54* (2013.01); *G01M 3/227* (2013.01); *G01M 3/229* (2013.01); *B29C 70/44* (2013.01)

(58) Field of Classification Search
CPC ........ G01M 3/20; G01M 3/229; G01M 3/227; B29C 70/54; B29C 70/44

USPC .................................................. 73/40.7, 49.3
See application file for complete search history.

(56) References Cited

U.S. PATENT DOCUMENTS

| 3,487,677 A | 1/1970 | Molitor |
| 4,356,721 A | 11/1982 | White et al. |
| 5,524,478 A | 6/1996 | Joy et al. |
| 5,668,307 A | 9/1997 | Wade |

(Continued)

FOREIGN PATENT DOCUMENTS

| EP | 0556542 | 8/1993 |
| GB | 1293569 | 10/1972 |

(Continued)

OTHER PUBLICATIONS

European Search Report, dated Nov. 17, 2015, priority document.

*Primary Examiner* — Peter Macchiarolo
*Assistant Examiner* — Anthony W Megna Fuentes
(74) *Attorney, Agent, or Firm* — Greer, Burns & Crain Ltd.

(57) ABSTRACT

Inspection methods and systems for detecting leaks in a vacuum bag assembly used in the manufacture of a composite part based on spraying helium over the vacuum bag and detecting the helium drawn by the vacuum inside the vacuum bag through a leak. The inspection methods comprise creating a local helium atmosphere in a chamber over the vacuum bag assembly by zones, following a programmed zonal sequence, for a first leak detection test of each zone and a subsequent second leak detection test if the first test gives a positive result. The inspection systems comprise a helium spraying system and helium detecting equipment arranged to implement the inspection methods.

9 Claims, 3 Drawing Sheets

(56) References Cited

U.S. PATENT DOCUMENTS

| | | | |
|---|---|---|---|
| 6,508,909 B1* | 1/2003 | Cerezo Pancorbo | B29C 70/44 156/245 |
| 2007/0175171 A1* | 8/2007 | Delgado | B29C 70/446 52/741.1 |
| 2008/0307858 A1 | 12/2008 | McManus et al. | |
| 2009/0243128 A1* | 10/2009 | Nelson | B29C 43/3642 264/40.1 |
| 2009/0320995 A1* | 12/2009 | Menendez Martin | B29C 43/3642 156/201 |
| 2011/0011164 A1* | 1/2011 | Terentiev | G01M 3/227 73/40.7 |
| 2011/0259086 A1* | 10/2011 | Harris | G01N 31/225 73/40.7 |
| 2011/0315307 A1* | 12/2011 | Perez Pastor | B29C 70/446 156/242 |
| 2013/0255360 A1 | 10/2013 | Minami et al. | |
| 2015/0273809 A1* | 10/2015 | Thomas | B29C 70/44 156/285 |
| 2016/0318238 A1* | 11/2016 | Miguez Charines | B29C 65/02 |

FOREIGN PATENT DOCUMENTS

| | | |
|---|---|---|
| JP | S60178332 | 9/1985 |
| WO | 2008088435 | 7/2008 |

\* cited by examiner

INSPECTION METHODS AND SYSTEMS FOR DETECTING LEAKS IN VACUUM BAG ASSEMBLIES

CROSS-REFERENCES TO RELATED APPLICATIONS

This application claims the benefit of the European patent application No. 15382281.2 filed on May 28, 2015, the entire disclosures of which are incorporated herein by way of reference.

FIELD OF THE INVENTION

The present invention relates to the detection of leaks in vacuum bag assemblies used in the manufacture of composite parts in, particularly, the aeronautic industry.

BACKGROUND OF THE INVENTION

The intensive introduction of advanced composites or composite materials in primary aircraft structures has become one of the priority objectives in the design and manufacture of a new generation of aircraft because of the possibilities they provide for structural optimization.

As is well known, the manufacture of composite parts made from polymeric fibrous reinforcements and resins for aircraft structures involves its curing within a vacuum bag under certain conditions of temperature and pressure. It is therefore essential that no pressure loss occur in the vacuum bag during curing processes.

Vacuum bags used for manufacturing composite parts consist of different types of plastic materials depending on the maximum temperature of use and their elongation capacity until their rupture. The temperature range can be between 420° and 120° and the elongation capacity can reach 500%. Different materials such as nylon, polyolefin, polyamide or thermoplastic elastomers in one or more layers are used.

As these materials are susceptible to breakage, the manufacturing processes of composite materials must necessarily consider the use of leak detection methods in vacuum bags.

The existence of such leaks can be easily detected through measurements of pressure within the vacuum bag but their location can be very difficult particularly in the case of large bags using known methods and in particular ultrasonic detectors. The method probably most used in industry for locating leaks in vacuum bags is based on the use of ultrasound, and in fact, manufacturers of vacuum bags often include in their catalogs ultrasonic detectors that convert the ultrasound produced by pressure losses in audible sound that is amplified as closer is to the detector.

There are other proposals, such as that described in WO 2008/088435 A1, which is based on the incorporation into the vacuum bag of a film sensitive to oxygen that changes appearance when a leak occurs.

The use of thermograph equipment (particularly IR cameras) for detecting leaks is also known.

Another method of detecting leaks in tools includes the use of a helium detector wherein a helium emitter is moved along the tool when placed under vacuum. When helium is drawn into a leak, the detector is activated in order to indicate the location of the leak.

These detection techniques have significant costs and do not adapt equally to various sizes of vacuum bags that are used particularly in the aircraft industry. Ultrasound detectors require a complete inspection of the part approaching the ultrasonic detector to the areas of the part susceptible to have leaks, which entails significant costs and limits its use in large pieces. The incorporation into the vacuum bag of a film sensitive to oxygen significantly increases its cost.

In any case, there is a need of inspection methods and systems for detecting leaks that produce pressure loss of small entity in vacuum bag assemblies for manufacturing large composite parts, particularly in the case of manufacturing methods where the vacuum bag covers directly all the components of the composite part (called "direct bag" methods).

SUMMARY OF THE INVENTION

In one aspect, the invention provides an inspection method for detecting leaks in a vacuum bag assembly used in the manufacture of a composite part based on spraying helium over the vacuum bag and detecting the helium drawn by the vacuum inside the vacuum bag through a leak.

The inspection method comprises creating a local helium atmosphere over the vacuum bag assembly by zones, following a programmed zonal sequence for a first leak detection test of each zone. The local helium atmosphere is created inside a chamber placed over each zone. The first leak detection test gives a positive result when the helium detected inside the vacuum bag by a helium detecting equipment exceeds a predetermined first threshold, and in that case, the zone is submitted again to a new local helium atmosphere for a second leak detection test. The second leak detection test gives a positive result when the helium detected by the helium detecting equipment inside the vacuum bag exceeds a predetermined second threshold.

The inspection method allows, therefore, a quick scanning of the whole surface of the vacuum bag assembly, discarding those zones where the first leak detection test gives a negative result, and identifying the zones where the second leak detection test gives a positive result as those zones where there is a high likelihood of finding a leakage.

Advantageously, the creation of a local helium atmosphere over a zone comprises a first step of helium injection and a second step of helium exposure, their duration times being control variables of the inspection method, with different values for the first and second leak detection tests (longer for the second test).

Advantageously, the inspection of a zone further comprises a third step of helium removal, its duration time being a control variable of the inspection method with different values for the first and second leak detection tests.

Advantageously, the beginning of the inspection of a new zone requires a waiting time after finishing the inspection of the previous zone, the waiting time being a control variable of the inspection method with different values for the first and second leak detection tests.

In an embodiment, the vacuum bag assembly comprises a cured panel, a plurality of uncured stiffening stringers, curing tools for the uncured stiffening stringers with fastening clamps and a vacuum bag arranged directly over the composite part. The vacuum bag is formed joining individual bags for the uncured stiffening stringers and other bag pieces to cover the whole panel. The zones of the vacuum bag assembly to be covered by the chambers are set so that, in the direction of the stiffening stringers, have a predetermined length and in the direction transverse to the stringers comprise, for each stringer, the space occupied by the stinger's individual bag, the sealing area of two contiguous individual bags being assigned to the zone of one of the individual bags, so that the sealing area can be covered by one chamber.

In another aspect, the invention provides a system for implementing the above mentioned method. Two basic components of the system are a helium spraying system for spraying helium over the vacuum bag assembly and helium detecting equipment to detect helium drawn by the vacuum inside the vacuum bag through a leak. The helium spraying system comprises apparatus configured to create a local helium atmosphere over individual zones of the vacuum bag assembly, so that the helium detecting equipment can detect the helium drawn by the vacuum in the individual zones through a leak, particularly a chamber to be positioned over the individual zones for housing the local helium atmosphere and helium injection apparatus in the chamber. The helium spraying system is configured for carrying out the inspection of the vacuum bag assembly by zones following a programmed zonal sequence.

In an embodiment for the above mentioned vacuum bag assembly, the helium spraying system comprises a portal configured and arranged to be displaced over the vacuum bag assembly in the direction of the stiffening stringers and a plurality of arms aligned with the stiffening stringers so that each arm can position a chamber over a zone of the vacuum bag assembly, the arms been connected to a helium bottle through pipes.

Other characteristics and advantages of the present invention will be clear from the following detailed description of embodiments illustrative of its object in relation to the attached drawings.

DETAILED DESCRIPTION OF THE PREFERRED EMBODIMENTS

The invention is described in connection with an assembly of the components of a composite stiffened panel in a vacuum bag before subjecting the components to a curing process in an autoclave.

Figure 1A:
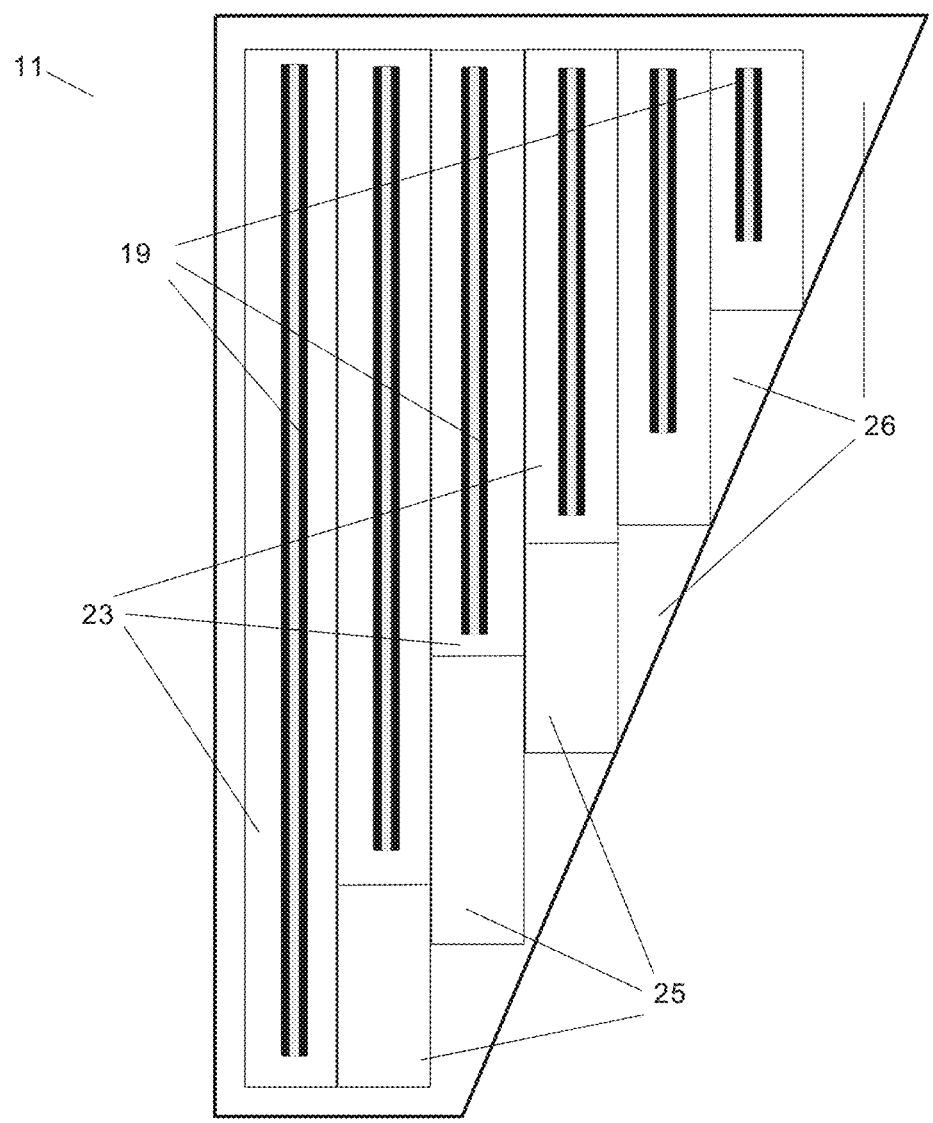
FIGS. 1a and 1b are, respectively a schematic plan view and a partial schematic elevation view of a vacuum bag assembly of a composite part comprising a cured panel and uncured stiffening stringers to be submitted to an autoclave cycle for co-bonding the stiffening stringers to the panel, the vacuum bag being applied directly over the stiffening stringers and the panel.
Figure 1B:
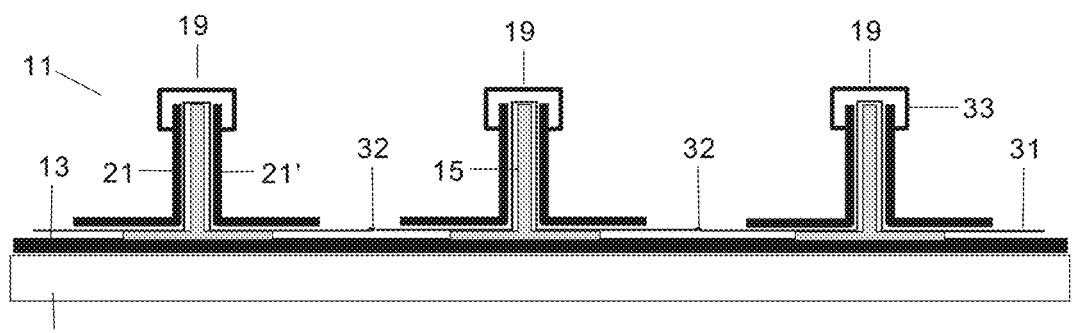

The vacuum bag assembly 11 (see FIGS. 1a and 1b), arranged on a mold 14, comprises a cured panel 13 and several ensembles 19 formed by uncured stringers 15 disposed inside a vacuum bag 31 and between curing tools 21, 21' provided with fastening clamps 33 for controlling the distance between them. The vacuum bag 31 for the whole assembly 11 is formed joining individual bags 23 for each ensemble 19 and other parts 25, 26 to cover the rest of the panel 13. The joining of the various parts of the vacuum bag 31 is made using sealing tapes 32.

Figure 2:
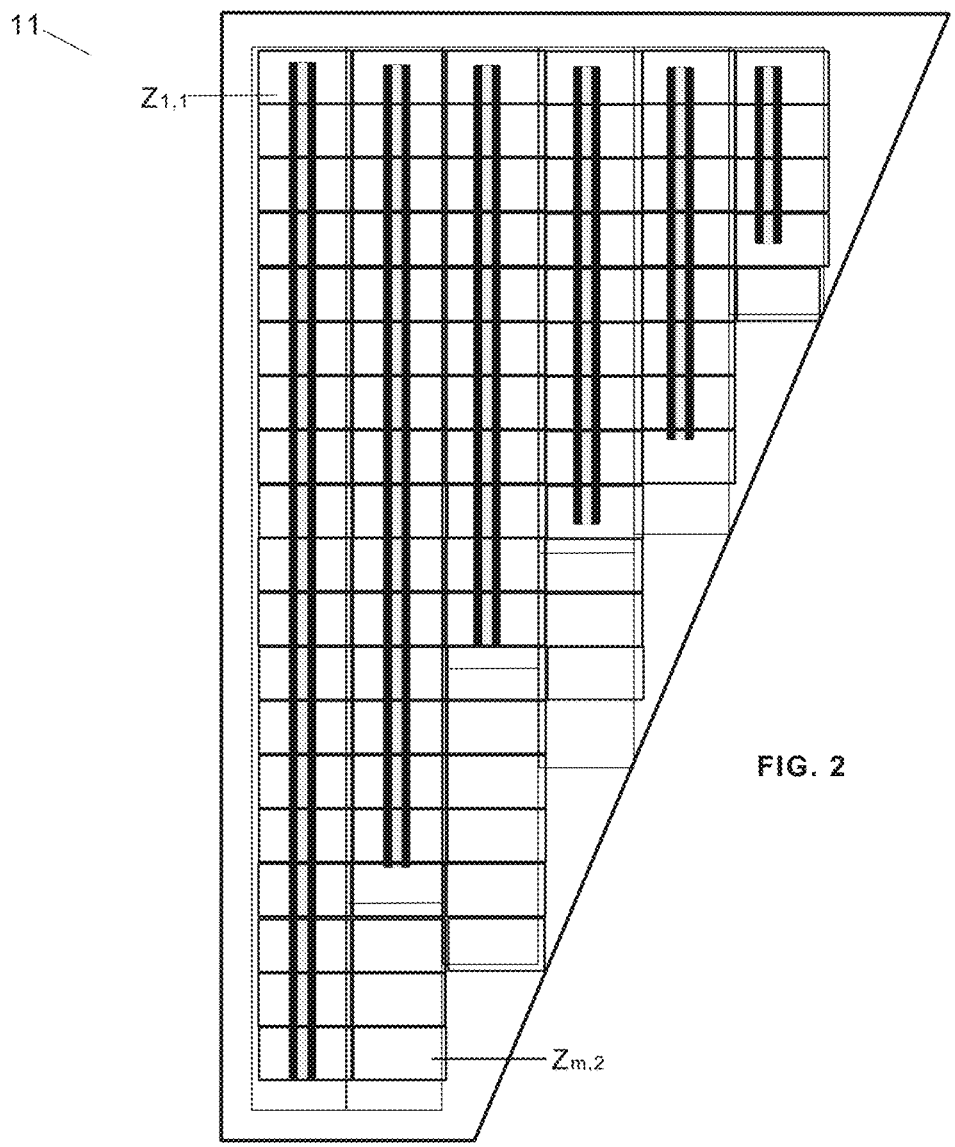
FIG. 2 adds to FIG. 1a the zoning to be followed by the inspection method of the invention.

Vacuum will be pulled on the vacuum bag assembly 11 and a standard vacuum leakage detection test shall be performed. If the vacuum bag assembly 11 passes the test it will go to the autoclave for co-bonding the stringers 15 to the panel 13. If the test is failed, the inspection method according to the invention, which is based on inspecting the vacuum bag assembly 11 by zones, shall start. Typically, it will begin inspecting the first row starting in zone Z1,1 and finish inspecting the last zone Zm,2 in the last row (see FIG. 2).

In each zone a first leak detection test using helium to rule out any leakage will be performed in the first place. If its result is positive, a second leak detection test using helium will be performed to confirm whether or not helium is detected inside the vacuum bag at a certain level.

Carrying out the inspection of the vacuum bag assembly 11 in the above-mentioned two steps allows a very quick inspection procedure.

The inspection is based on spraying helium at each of the zones in a chamber located over the zones so that a local atmosphere is created with the helium injected into the chamber, and to establish a correspondence between the detection of helium within the vacuum bag 31 and the particular zone where the helium local atmosphere is created, indicating a probable presence of a leak in the zone (or close to the zone). The use of this chamber is especially necessary where, as in the vacuum bag assembly 11, there are areas of the vacuum bag 31 not visible, as those that are located between the curing tools 21, 21' and the uncured stringers 15.

Figure 4:
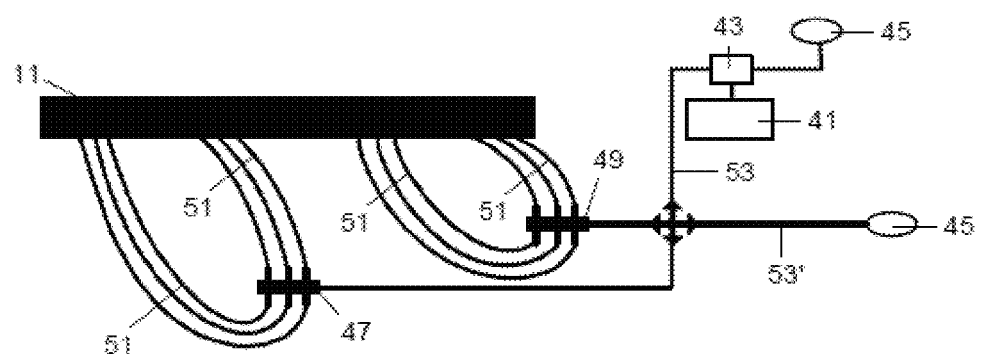
FIG. 4 is a schematic view of the helium detecting equipment used in an embodiment of the method of the invention.

In an embodiment, the equipment for the detection of helium inside the vacuum bag comprises (see FIG. 4), a leak detector 41, a gas dosing valve 43, and two auxiliary pumps 45 connected to hoses 53, 53' and two hubs 47, 49 connecting a plurality of vacuum mold probes 51 with the hoses 53, 53'.

The auxiliary pumps 45 are needed for two mean reasons:
  Get the highest possible vacuum level inside the vacuum bag 31. High vacuum level on the bag is required to increase the sensitivity for leakage detection.
  Recover, in a short period of time, the vacuum level inside the vacuum bag 31, when it is required to open it (as when it is necessary to reduce the amount of helium accumulated inside).

The main pump will be on during the most time of the leak test, whereas the second pump will be used mainly for quick vacuum recovery and as a backup pump in case of maintenance of the main pump.

The gas dosing valve 43 is necessary to maintain the minimum required vacuum level at the input of the leak detector 41, independently of the health of the vacuum bag 31.

Especially at first stages of helium leakage detection, the vacuum bag 31 may have too many leakages, and the pump is not able to create a vacuum level so low for the spectrometer to measure.

During the detection process and in order to increase helium detection sensitivity, this valve should be kept as open as possible.

The leak detector 41 is based upon mass spectrometers and quartz window sensors. Mass spectrometers ionize a gas mixture and isolate the desired tracer gas (helium in this case) on the basis of their mass-to-charge ratio. Quartz window sensors are based on the selective permeation of light gases through a quartz membrane.

Distance from the leak detector 41 to the vacuum bag assembly 11 shall be minimized. Therefore, length and volume of hoses 53, 53' will be minimized to avoid water vapor condensation.

A computer system (not shown in the Figures), connected to the leak detector 41 and to the helium spraying management system 61 would provide the results obtained in the above-mentioned detection tests.

The computer system will have the following information:

Positions of chambers 55.
Criteria used to determine leakages in each zone of the vacuum bag assembly 11.
Parameterization of leakages and thresholds for each criterion.

During the inspection, a leakage map will be shown in screens and printed on paper. In the images, a color code will be used to indicate the chambers 55 where helium has been sprayed with different colors for different leakage levels and the chamber 55 where helium is being injected at present.

Figure 3:
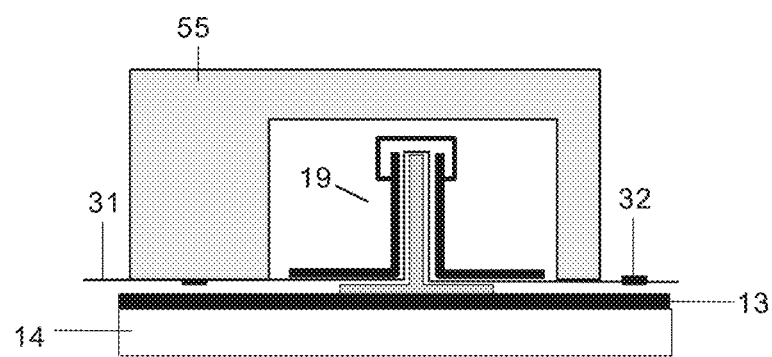
FIG. 3 is an elevation view of a zone of the vacuum bag assembly covered by a chamber where a local atmosphere of helium is created.

The chambers 55 may have a length (in the stringer direction) of, for instance 1 m and the width needed to cover one ensemble 19 and one of the adjacent sealing tapes 32 (see FIG. 3). The internal volume of the chambers will be minimized as much as possible to reduce helium consumption and improve chamber performance. For a rigid chamber, the volume can be minimized with interior curable foam.

The chambers 55 are made of a transparent material to allow a view of possible interferences with the curing tools 21, 21' or the fastening clamps 33.

The chambers 55 should be as closed as possible to improve helium concentration and facilitate helium recovery.

The material used in contact with the surface will be flexible to accommodate different geometries of panel 13 and soft to avoid damage to the vacuum foil, but shall not seal if there is a pore in the vacuum foil.

Figure 5:
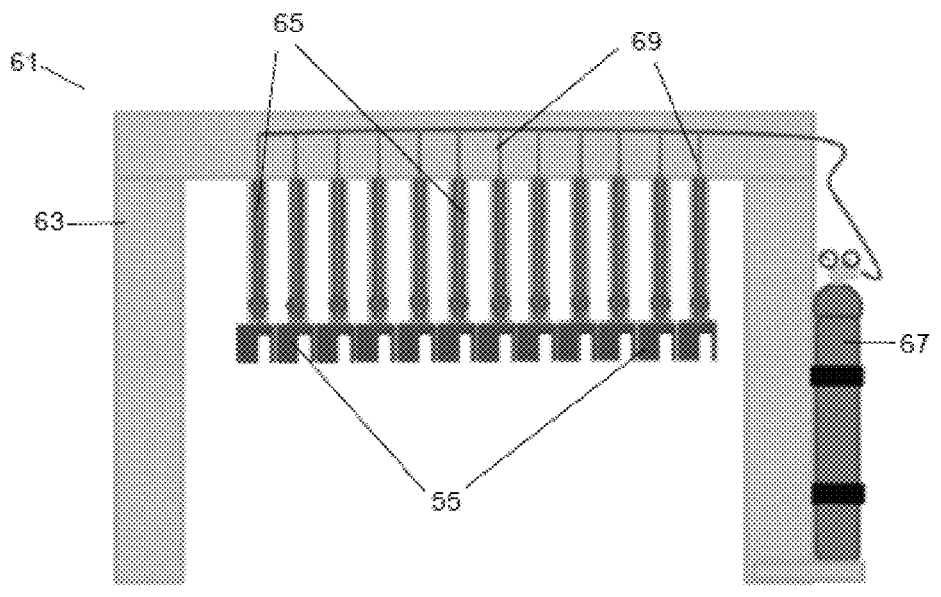
FIG. 5 is a schematic view of the helium spraying system used in an embodiment of the method of the invention.

In an embodiment, the helium spraying system 61 (see FIG. 5) comprises a portal 63 configured and arranged to be displaced longitudinally over the vacuum assembly 11 and a plurality of arms 65 aligned with the stringers (seven in this case) so that each arm 65 can position a chamber 55 over a zone of the vacuum bag assembly 11 to spray helium and to retrieve it at the end of the inspection of the zone. The arms 65 are connected to a helium bottle 67 and have pipes 69 to carry the helium to the chambers 55.

Helium should be sprayed along a chamber 55 at the same time, especially if the chamber is long, to get a uniform helium concentration. As helium is lighter than air, it shall be sprayed from the lowest rigid part, so it will naturally go to the upper part. It is essential to spray helium from both sides of the chamber 55.

The quantity of helium released in each chamber 55 shall be controlled. One way to do it is controlling the helium pressure on the distribution pipes 69 and releasing the gas for a period of time with an electric valve. Time shall be controlled at least in 1 second intervals. Typical application time used in tests is 2 seconds.

After applying the helium it is necessary to wait a few seconds for the gas to diffuse over the entire surface of the vacuum bag 31 and to penetrate inside if there is an aperture in the vacuum foil. After this time, the helium chamber should be evacuated from inside. For helium removal at least one wide port will be situated on the top part of the chamber. After evacuation the chamber will be lifted from the surface.

As said before, the inspection method of the invention includes a first leak detection test to be performed on all the zones subject to inspection and a second leak detection test to be performed on those zones where the first leak detection test gives a positive result, immediately after the first leak detection test.

The control variables for both tests are the same and include:

Time of helium injection in each chamber.
Time for helium exposure in each chamber.
Time for helium removal in each chamber.
Waiting time for helium injection in next chamber.

Logically the values of the variables for both tests are adapted to their objectives and are in a range of a few seconds.

The inspection method of the invention can be automated to a high degree so that a first test of an assembly of a large composite part, such as a cover of an aircraft wing, can be performed in less than one hour.

It is important to note that the objective of the inspection method of the invention is not identifying exactly the position of a leak in a vacuum bag assembly but to identify the zones in which the application of helium through the chambers is creating the highest helium detection in the spectrometer. It can happen that a zone registers a leakage signal, but the leakage does not have to be in that zone. Once the potential leakage areas are identified they are recorded for later manual inspection and rework.

Finally, it should be noted that the present invention can identify leaks in non-visible areas of the vacuum bag, which exist when "direct bag" manufacturing methods are used as they are covered by curing tools. This type of leak cannot be detected with known methods.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An inspection method for detecting leaks in a vacuum bag assembly used in the manufacture of a composite part, the method comprising spraying helium over the surface of the vacuum bag and using helium detecting equipment to detect helium dragged by the vacuum inside the vacuum bag through a leak, comprising the steps of:

creating a local helium atmosphere over the vacuum bag assembly by zones following a programmed zonal sequence for a first leak detection test of each zone; the local helium atmosphere being created inside a chamber placed over each zone; the first leak detection test giving a positive result when the helium inside the vacuum bag detected by the helium detecting equipment exceeds a predetermined first threshold;

due to the first leak detection test giving a positive result in a particular zone, creating a new local helium atmosphere over the zone for a second leak detection test; the second leak detection test giving a positive result when the helium inside the vacuum bag detected by the helium detecting equipment exceeds a predetermined second threshold.

2. An inspection method according to claim 1, wherein the creation of the local helium atmosphere and the new local helium atmosphere over the zone comprises a first step of helium injection and a second step of helium exposure, a duration time of helium injection and a duration time of helium exposure being control variables of the inspection method with different values for the first and second leak detection tests.

3. An inspection method according to claim 2, wherein inspection of the zone further comprises a third step of helium removal, a duration time of helium removal being a control variable of the inspection method with different values for the first and second leak detection tests.

4. An inspection method according to claim 1, wherein a beginning of the inspection of a new zone requires a waiting time after finishing the inspection of the previous zone, the waiting time being a control variable of the inspection method with different values for the first and second leak detection tests.

5. An inspection method according to claim 1, wherein: the vacuum bag assembly comprises a cured panel, a plurality of uncured stiffening stringers, curing tools for the uncured stiffening stringers with fastening clamps and the vacuum bag arranged directly over the composite part; the vacuum bag is formed by joining individual bags for the uncured stiffening stringers and other bag pieces to cover the whole panel; the zones of the vacuum bag assembly to be covered by a plurality of chambers are set so that, in a direction of the stiffening stringers, the zones have a predetermined length and in a direction transverse to the stiffening stringers comprise, for each stringer, the space occupied by its individual bag, the sealing tape of two contiguous individual bags being assigned to the zone of one of the individual bags so that the sealing tape is covered by one chamber.

6. An inspection method according to claim 5, wherein the composite part is a cover of an aircraft wing.

7. An inspection system for detecting leaks in a vacuum bag assembly used in the manufacture of a composite part comprising: a helium spraying system configured to spray helium over the vacuum bag assembly, and helium detecting equipment configured to detect helium drawn by a vacuum inside the vacuum bag through a leak, the helium spraying system comprising an apparatus configured to create a local helium atmosphere over individual zones of the vacuum bag assembly so that the helium detecting equipment detects the helium drawn by the vacuum in the zone through a leak; the apparatus including a chamber configured to be positionable over the individual zones for housing the local helium atmosphere and a helium injection apparatus in the chamber; the helium spraying system being configured to carry out the inspection of the vacuum bag assembly by zones following a programmed zonal sequence, wherein: the vacuum bag assembly comprises a cured panel, a plurality of uncured stiffening stringers, curing tools for the uncured stiffening stringers with fastening clamps and a vacuum bag arranged directly over the composite part; the vacuum bag being formed by joining individual bags for the uncured stiffening stringers and other bag pieces to cover an entire panel of the composite part; the zones of the vacuum bag assembly to be covered by a plurality of chambers being set so that in a direction of the stiffening stringers the zones have a predetermined length and in a direction transverse to the stiffening stringers the zones comprise, for each stringer, a space occupied by the stringer's individual bag, the sealing tape of two contiguous individual bags being assigned to the zone of one of the stringers so that the sealing tape is covered by one chamber.

8. The inspection system according to claim 7, wherein the helium spraying system comprises a portal configured and arranged to be displaced over the vacuum bag assembly in the direction of the stiffening stringers and a plurality of arms aligned with the stiffening stringers so that each arm positions a chamber over a zone of the vacuum bag assembly; the arms having been connected to a helium bottle through pipes.

9. The inspection system according to claim 7, wherein the helium detecting equipment comprises a leak detector, regulated by a gas dosing valve, and two auxiliary pumps connected by hoses to a plurality of vacuum mold probes through hubs.

* * * * *